US007882152B2

(12) United States Patent
Beadles et al.

(10) Patent No.: US 7,882,152 B2
(45) Date of Patent: Feb. 1, 2011

(54) SELECTION AND STORAGE OF POLICIES IN NETWORK MANAGEMENT

(75) Inventors: Mark A. Beadles, Hilliard, OH (US); William S. Emerick, Dublin, OH (US); Kevin A. Russo, Lewis Center, OH (US); Kenneth E. Mulh, Upper Arlington, OH (US); Raymond J. Bell, Mill Valley, CA (US)

(73) Assignee: Sophos PLC, Abingdon (GB)

( * ) Notice: Subject to any disclaimer, the term of this patent is extended or adjusted under 35 U.S.C. 154(b) by 1083 days.

(21) Appl. No.: 11/524,414

(22) Filed: Sep. 19, 2006

(65) Prior Publication Data

US 2007/0016597 A1 Jan. 18, 2007

Related U.S. Application Data

(62) Division of application No. 10/219,096, filed on Aug. 13, 2002, now Pat. No. 7,130,854.

(60) Provisional application No. 60/312,523, filed on Aug. 14, 2001.

(51) Int. Cl.
G06F 17/30 (2006.01)
(52) U.S. Cl. .................... 707/804; 707/792
(58) Field of Classification Search ................ 707/101, 707/607, 803, 804, 805, 827, 829; 709/224; 717/114; 719/327; 700/86; 710/81
See application file for complete search history.

(56) References Cited

U.S. PATENT DOCUMENTS

| | | | |
|---|---|---|---|
| 5,349,643 A | 9/1994 | Cox et al. | |
| 5,838,907 A | 11/1998 | Hansen | |
| 5,838,918 A | 11/1998 | Prager et al. | |
| 5,870,605 A | 2/1999 | Bracho et al. | |
| 5,872,928 A | 2/1999 | Lewis et al. | |

(Continued)

OTHER PUBLICATIONS

R. Chaudhury et al., Directory Schema Level Administration of Differentiated Services and Integrated Services in Networks, Jun. 28, 1998, http:murchinson.org/den, pp. 1-20.

(Continued)

Primary Examiner—Diane Mizrahi
(74) Attorney, Agent, or Firm—Strategic Patents, P.C.

(57) ABSTRACT

User interface and policy loading aspects of a policy-based, outsourced, network management system. In one aspect, a user selects policies using a graphical user interface (GUI) with a two paned window having a tree view of the policies in one pane. In another aspect, the policies are (1) created in the GUI format (e.g., XML), (2) sent over a network (e.g., the internet) to a service center in the same format, and (3) are loaded, manipulated and stored in the same format. In another aspect, the initial loading of the policies is done using a bulk loader in a logic layer. In another aspect, the logic layer also includes a configuration checker which handles changes or additions to policies in a finished network management system. Any aspects of the new or changed policy that are inconsistent with the finished system are parsed and stripped out. In another aspect, where the details of a new policy or change aren't specified, a base configuration creator creates a policy with minimal attributes. In another aspect, the logic layer also contains a device control console, which allows bypassing the policy creating and configuring to allow a user to directly access a device for configuration.

8 Claims, 17 Drawing Sheets

U.S. PATENT DOCUMENTS

| | | | |
|---|---|---|---|
| 5,889,953 | A | 3/1999 | Thebaut et al. |
| 5,987,611 | A | 11/1999 | Freund ....................... 713/201 |
| 6,070,246 | A | 5/2000 | Beser |
| 6,170,009 | B1 | 1/2001 | Mandal et al. |
| 6,243,747 | B1 | 6/2001 | Lewis et al. |
| 6,327,660 | B1 | 12/2001 | Patel |
| 6,330,560 | B1 | 12/2001 | Harrison et al. ................ 707/8 |
| 6,393,473 | B1 | 5/2002 | Chu |
| 6,434,568 | B1 | 8/2002 | Bowman-Amuah |
| 6,452,915 | B1 | 9/2002 | Jorgensen ................... 370/338 |
| 6,463,470 | B1 | 10/2002 | Mohaban et al. |
| 6,466,984 | B1 | 10/2002 | Naveh et al. |
| 6,505,244 | B1 | 1/2003 | Natarajan et al. |
| 6,539,427 | B1 | 3/2003 | Natarajan et al. |
| 6,539,483 | B1 | 3/2003 | Harrison et al. |
| 6,577,597 | B1 | 6/2003 | Natarajan et al. |
| 6,584,502 | B1 | 6/2003 | Natarajan et al. |
| 6,590,885 | B1 | 7/2003 | Jorgensen ................... 370/338 |
| 6,611,863 | B1 | 8/2003 | Banginwar et al. |
| 6,725,260 | B1 | 4/2004 | Philyaw |
| 6,751,729 | B1 | 6/2004 | Giniger et al. |
| 6,771,661 | B1 | 8/2004 | Chawla et al. |
| 6,915,436 | B1 | 7/2005 | Booth et al. |
| 6,918,039 | B1 | 7/2005 | Hind et al. |
| 6,922,724 | B1 | 7/2005 | Freeman et al. |
| 7,054,924 | B1 * | 5/2006 | Harvey et al. ................ 709/220 |
| 7,395,322 | B2 * | 7/2008 | Harvey et al. ................ 709/220 |
| 2003/0046214 | A1 * | 3/2003 | Menninger ................... 705/37 |
| 2003/0069767 | A1 * | 4/2003 | Menninger ....................... 705/7 |
| 2003/0069794 | A1 * | 4/2003 | Hoffman et al. ............... 705/22 |
| 2003/0074580 | A1 | 4/2003 | Knouse et al. |
| 2003/0107590 | A1 | 6/2003 | Levillain et al. ............ 345/736 |
| 2003/0107950 | A1 | 6/2003 | Shephard et al. |
| 2004/0030771 | A1 * | 2/2004 | Strassner .................... 709/224 |
| 2004/0044891 | A1 | 3/2004 | Hanzlik et al. |
| 2005/0038707 | A1 * | 2/2005 | Roever et al. ................. 705/21 |
| 2005/0132229 | A1 | 6/2005 | Zhang et al. |
| 2007/0044144 | A1 | 2/2007 | Knouse et al. |
| 2009/0106433 | A1 | 4/2009 | Knouse et al. |

OTHER PUBLICATIONS

Herscovitz, Eli, Secure Virtual Private Networks: The Future of Data Communications, John Wiley and Sons, N.Y. N.Y., Jul. 4-Aug. 1999, vol. 9, Issue 4, pp. 213-220.

"U.S. Appl. No. 11/525,882, Non-Final Office Action mailed Feb. 18, 2010", , 14.

* cited by examiner

- RULES ON COMMANDS ALLOWED
- VERSION CONFIG CHANGES
- INTERFACES UP/DOWN

SELECTION AND STORAGE OF POLICIES IN NETWORK MANAGEMENT

CROSS-REFERENCES TO RELATED APPLICATIONS

This application is a division of application Ser. No. 10/219,096, "Selection and Storage of Policies in Network Management", which claims the benefit of Provisional Application No. 60/312,523, filed Aug. 14, 2001. This application is related to copending application Ser. No. 10/219,236, "Policy Engine For Modular Generation Of Policy For A Flat, Per-Device Database", Ser. No. 10/219,187, "Event Management For A Remote Network Policy Management System", Ser. No. 10/219,091, "Device Plug-In System For Configuring Network Devices Over A Public Network" and Ser. No. 10/219,142, "Modular Remote Network Policy Management System", all filed on Aug. 13, 2002, and assigned to the same assignee, and all incorporated herein by reference. This application is related to copending application Ser. No. 11/523,974, "Selection and Storage of Policies in Network Management", and Ser. No. 11/523,882, "Selection and Storage of Policies in Network Management", all filed on even date herewith and assigned to the same assignee, and all incorporated herein by reference.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to management and control of communication networks and, in particular, to management and control of communication networks via policies and over a network.

Networks

A communication network typically includes a number of network devices that, among other functions, transmit or receive data. A local area network, commonly referred to as a LAN, is a privately owned network that facilitates communication among the devices coupled to the network via one of several data communication protocols such as Ethernet or FDDI. Multiple LANs are typically interconnected via, for example, private links or satellite transmissions to form a wide area network, commonly referred to as a WAN. Such LANs and WANs are increasingly being interconnected through the internet.

Communication network systems are becoming ever more complex. To increase resource sharing and facilitate their supervision, computer systems, such as facsimile machines, desktop computers, printers, etc. are typically coupled to a LAN. The complexity that arises as a result of increasing the number and the variety of systems, which in the aggregate form a computer network, coupled with the variety of communication protocols that such devices are required to support, increase the knowledge base that is often required to manage such networks. The problem is further compounded by the increasing complexity of new generation of high performance network devices and their interoperability as well as by the lack of qualified and well-trained network administrators. To operate and conform to a network's objectives, a network device (e.g. a router) is first configured—i.e., the networking parameters of the device are set to desired values. An inventory as well as a record of the configuration parameters of each configured networked device is typically maintained for future reference. Network devices are often reconfigured (e.g., by changing router ports, routing tables, IP addresses) to accommodate for network expansion or modification—for example, to add a new user to the network.

Device Based Network Management

One conventional method of configuring a networked device is to issue commands which are specific to the device via a computer system. A drawback of this method is that each networked device is configured and subsequently verified separately to ensure its conformity with the desired network objectives. Another drawback of this method is that it requires an extensive knowledge base—of the various network device types—which may become prohibitively large as the number of device types in a network rises.

Outsourcing Network Management

Another known method for managing a communications network is through outsourcing the network management to another commercial entity. For example, WorldCom Inc., located at 500 Clinton Center Drive, Clinton Miss., 39056 offers a network management service based on which a group of network administrators at WorldCom, upon receiving specific requests to manage or configure a network device, transmit related commands and data via the internet to the network device thereby to manage or configure the device. The method, however, involves human intervention and is thus inefficient and unautomated.

Policy-Based Network Management

A third known method for managing networked devices is to include a number of individual devices of a given type in a policy domain and apply a set of policies to the domain. Such policy-based methods, however, are only applicable to a limited number of specific device types. Furthermore, in such conventional policy-based network communication systems, policies are defined through a descriptive programming language. The applied policies so defined become attributes of their associated devices and are thus not objects which can be pointed to and thus viewed.

In directory-enabled policy-based network management systems, a directory serves as the central location for storing policies, profiles, user information, network configuration data, and internet protocol (IP) infrastructure data, such as network addresses and server information. Policies in directory-enabled networking (DEN) are defined in terms of rules containing conditions and actions for managing users, network resources, and services/applications.

In DEN, physical details of a network are separated from the logical attributes of the application types. DEN has many key attributes and characteristics that typically enable an associated network to be rapidly reconfigured and operate with other platforms. A directory-enabled network is typically scalable, fault-tolerant, and, preferably recognizes people and application by their associated attributes and characteristics and not by their numerical sequences, such as their IP addresses.

Data stored in the directory of a directory-enabled network are typically in formats derived from standard schemas based on the DEN specification published by a group of companies which are collectively known as the Distributed Management Task Force (DMTF). A schema is a collection of rules defining the relationships among objects representing users, applications, network elements, and network services. Each schema contains rules which govern the organization and logical representation of the schema objects.

Access to a directory in DEN is commonly governed by version 3 of the lightweight directory access protocol (LDAPv3), which is a stripped down version of X.500 directory services standard. LDAP is used for bulk loading policies into a directory.

In a directory-enabled network, network entities and the relationship between such network entities are governed by an information system, known in the art as the common information model (CIM). A CIM contains rules regarding management of, for example, hardware, operating systems, operations, application installation and configuration, security, identity, etc. The CIM, which is also defined by the DMTF, is a standard object-oriented model that represents objects in terms of instances, properties, relationships, classes and subclasses. A primary goal of the CIM is to present a consistent view of managed networks independent of the protocols and data formats supported by the various devices in and applications running on the networks.

One known directory serving as the central storage location in a directory-enabled network is the Windows 2000 Active Directory™, which is developed by and is available from Microsoft Corporation located at One Microsoft Way, Redmond, Wash., 98052. In addition to serving as the central policy store, Windows 2000 Active Directory™ provides a framework for, among other functions, publishing network services, managing users, computer systems, applications and services, as well as secure intranet and internet network services. Furthermore, Windows 2000 Active Directory™ provides a backbone for distributed security in Windows 2000 and a central service point for administrators to manage network services. Windows 2000 Active Directory™, which is an effective platform for DEN, is based on standard protocols such as Domain Name System (DNS)—which is used to locate servers running Active Directory—LDAPv3 (described briefly above) and Kerberos—which is a security protocol for logon authentication.

The Windows 2000 Active Directory™ includes a schema with definitions for every object class that exists in the directory service. Therefore, the universe of objects that may be represented in the Active Directory™ is extensible. Other information related to the Windows 2000 Active Directory™ features and functions are available from Microsoft corporation. The Active Directory supports Component Object Model (COM) features. COM is a language independent standard that promotes object oriented programming by specifying the interfaces of a component at the binary level.

As stated above, conventional methods of configuring and maintaining a communication network are costly, time-consuming and require expert administrators capable of reliably managing and controlling ever more complex network systems in a timely manner.

BRIEF SUMMARY OF THE INVENTION

The present invention is directed to the user interface and policy loading aspects of a policy-based, outsourced, network management system. In one aspect, a user selects policies using a graphical user interface (GUI) with a two paned window having a tree view of the policies in one pane. In another aspect, the policies are (1) created in the GUI format (e.g., XML), (2) sent over a network (e.g., the internet) to a service center in the same format, and (3) are loaded, manipulated and stored in the same format. In another aspect, the initial loading of the policies is done using a bulk loader in a logic layer. In another aspect, the logic layer also includes a configuration checker which handles changes or additions to policies in a finished network management system. Any aspects of the new or changed policy that are inconsistent with the finished system are parsed and stripped out. In another aspect, where the details of a new policy or change aren't specified, a base configuration creator creates a policy with minimal attributes. In another aspect, the logic layer also contains a device control console, which allows bypassing the policy creating and configuring to allow a user to directly access a device for configuration.

In one embodiment, the management system is multi-layered, modular and stores device configuration data in non-device specific format, which are subsequently translated to device-specific format by lower layers of the management system. The non-device specific format is the same (e.g., XML) as that used to create the policies with the user GUI (e.g., browser) and transport them to the service center over the internet.

In one embodiment, a policy engine develops policies in a hierarchical format, but then stores the device schema, or objects, in a low-level, flat (non-hierarchical or parallel) database. Multiple hierarchical services which impact a single device have the characteristics related to that device knitted together, and then fed back to a policy store database as a flat file for that device, in a non-device specific format. Thus, instead of storing the policies separately, and in hierarchical linked format, the device descriptions are stored with the aspects of all policies that affect that device.

In one embodiment, the management system includes an interface which enables a user to navigate through policies using a two-paned window. On the left window of the interface, a hierarchical array of nested folders—each of which contains a network policy—are displayed for viewing and selection by the user (similar to the nested trees in Windows for file folders). The contents of a selected folder are displayed on the right window of the interface. This simplifies navigation, viewing and selection of the policies. This eliminates many of the inefficiencies of the prior art policy-based systems in which polices were defined in a file using a descriptive programming language (which do not provide for viewing of the policy hierarchy while viewing the policy objects).

In one embodiment, the bulk loader, after receiving the XML files identifying the user's selected policies and network devices (this file includes such information as the devices' types, manufacturers, model numbers, initial configuration information, IP addresses, etc.), loads the data into the database. Using the XML format eliminates the need to translate such files to LDAP, as is commonly done in the prior art policy management systems. The bulk loader includes a service for maintaining a thread pool, and implements COM components.

In one embodiment, a base configuration checker is used to validate a new base configuration when a customer modifies a device configuration without applying policies. The base configuration checker validates the configuration data for each managed device to ensure that such data do not violate network policies applied to the management system. The base configuration checker module has knowledge of the allowed configuration data for each managed device type. Upon receiving configuration data, the base configuration checker module parses the configuration data and commands, strips out invalid commands (e.g., commands that seek to assign a password for accessing a network device), checks the commands and data for any violations, such as grammatical and syntactical violations, as well as for any violations that may arise due to non-conformity with the selected network policies. Depending on the type of violation detected, the base configuration checker module either rectifies the detected violations or, alternatively, reports the violations and thereafter awaits corrective action by the user.

In one embodiment, a base configuration creator handles network devices that has not been previously configured or initialized. It eliminates the need to configure a previously unconfigured network device with base configuration data supplied by the device's manufacturer, as is commonly done in the prior art.

In one embodiment, a device console proxy module enables direct access to a network device, bypassing the layered management system. Once the device console proxy module is launched, the target managed device is disengaged from the management system. Thereafter, a secure communication tunnel is formed between the user and the target managed device. The user may subsequently issue control commands, (e.g. to trouble shoot) and receive responses from the target device via the tunnel. After the access to the target device is terminated, the tunnel is removed and the target managed device is engaged with and is again brought under the control of the management system.

DETAILED DESCRIPTION OF THE INVENTION

A. Overview of the Operational Stages of the System

The present invention provides policy-based outsourced network management system at a service center and thus manages and controls a communication network having multiple network device types over a network (e.g., the internet). The management of a typical communications system by the outsourced management system of the present invention is briefly shown in FIGS. 1A-1F, described below.

Figure 1A:
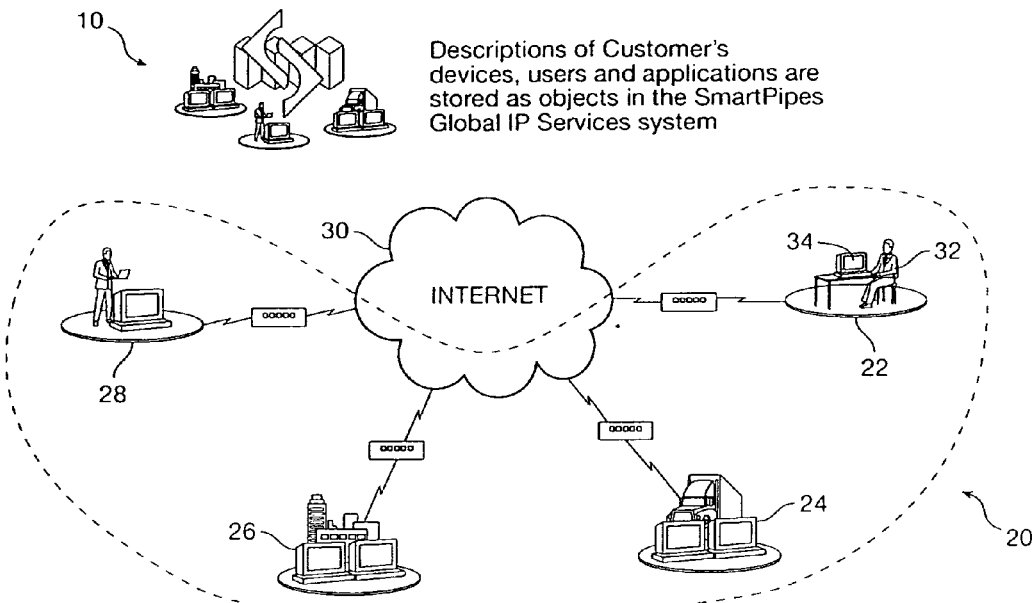
FIGS. 1A-1F show a client network communications system being managed by the policy-based network management system, in accordance with one embodiment of the present invention.

FIG. 1A shows a customer communications network 20 (shown inside the dashed perimeter lines and composed of network service points 22, 24, 26 and 28) that is coupled to the management system 10 via internet 30. Each network service point may include a number of network devices, such as routers, hubs, printers, facsimile machines, computer systems, etc. In FIG. 1A, internet 30 is shown as the communications medium via which customer 32 using his computer system 34 communicates with management system 10. The customer's devices are stored as objects in the management system 10.

Figure 1B:
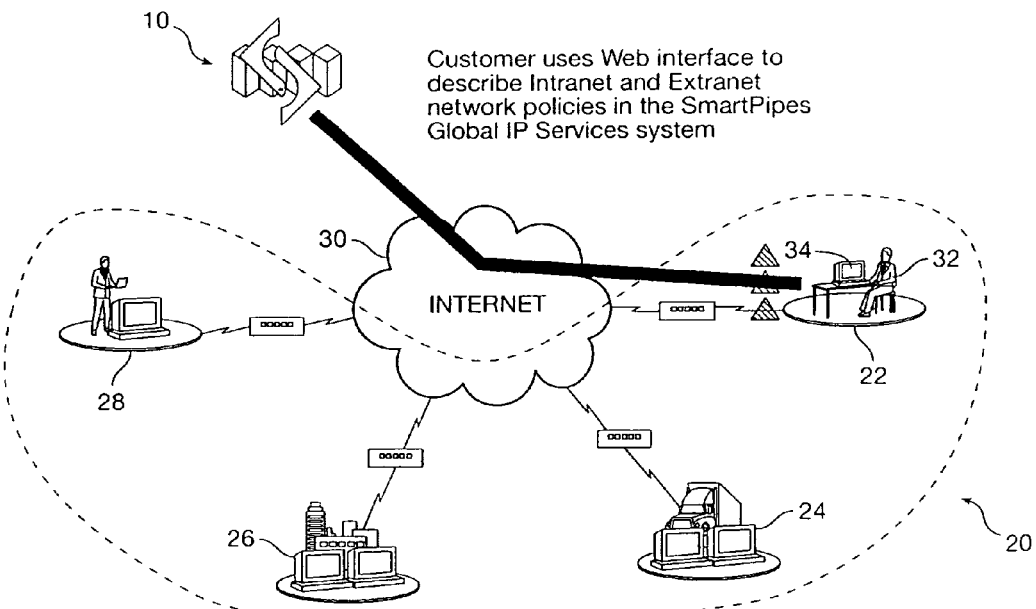

Next, as shown in simplified FIG. 1B, the customer describes intranet and extranet policies for configuring the network communications system 20 under the control and management of system 10. Customer 32 uses a graphical user interface (GUI) on his/her computer system 34, such as an internet browser. The customer describes network policies using the browser, then provides them over the internet to management system 10.

Figure 1C:
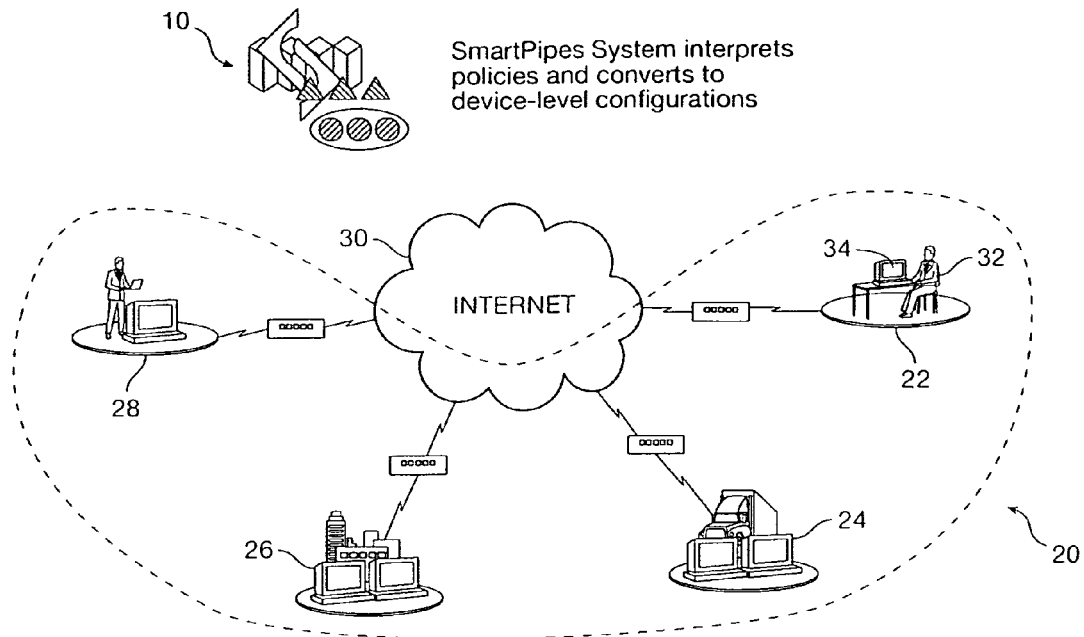

Next, as shown in simplified FIG. 1C, system 10 interprets and converts the selected network policies to device-level configuration data and stores the configuration data in a directory.

Figure 1D:
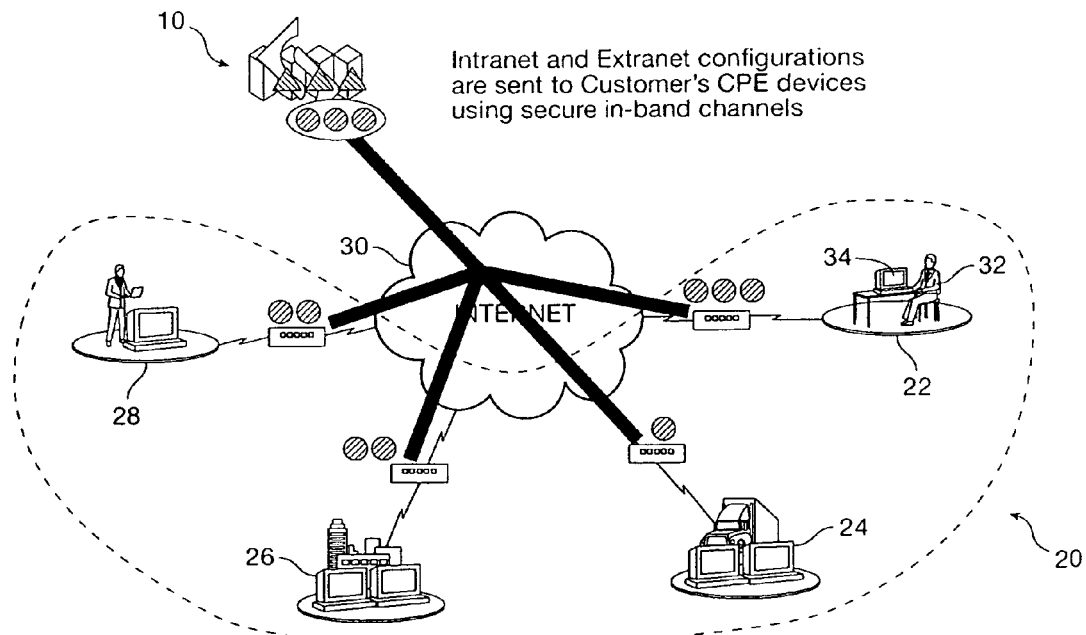

Next, as shown in simplified FIG. 1D, system 10 via the internet 30 and using a secure channel, applies the selected intranet and extranet policies to configure the network devices disposed in each of the network service points 22, 24, 26, and 28 to thereby bring the communication network 20 under its control.

Figure 1E:
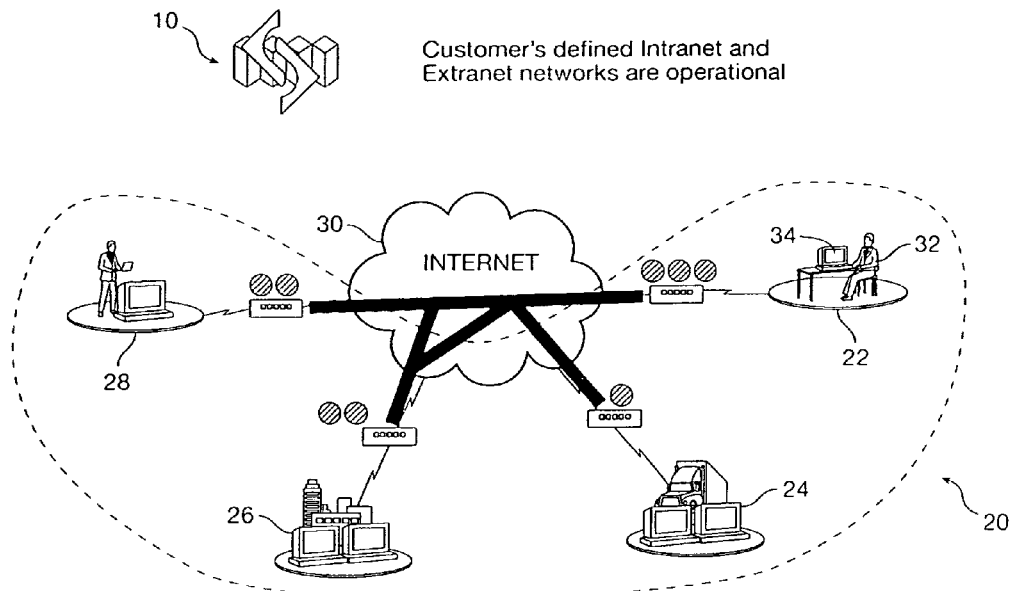

FIG. 1E shows that the system 10 has completed configuration of communications network 20, which therefore may carry out its intranet and extranet policies in accordance with the adopted policies.

Figure 1F:
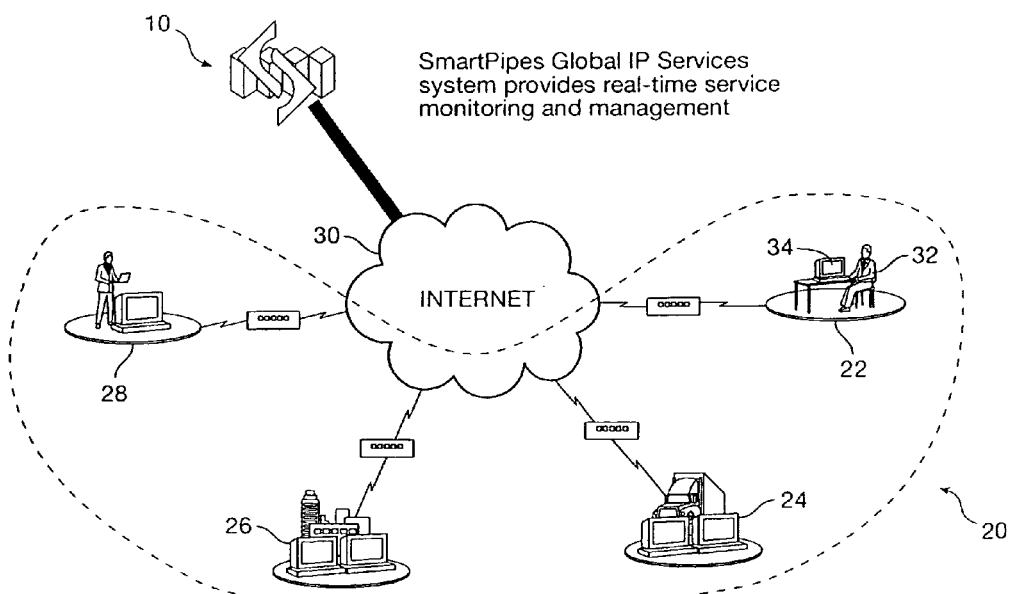

FIG. 1F shows that after configuring the network devices and applying the network policies, system 10 continues to monitor and manage network communications system 20 via internet 30.

B. System Overview

Figure 2A:
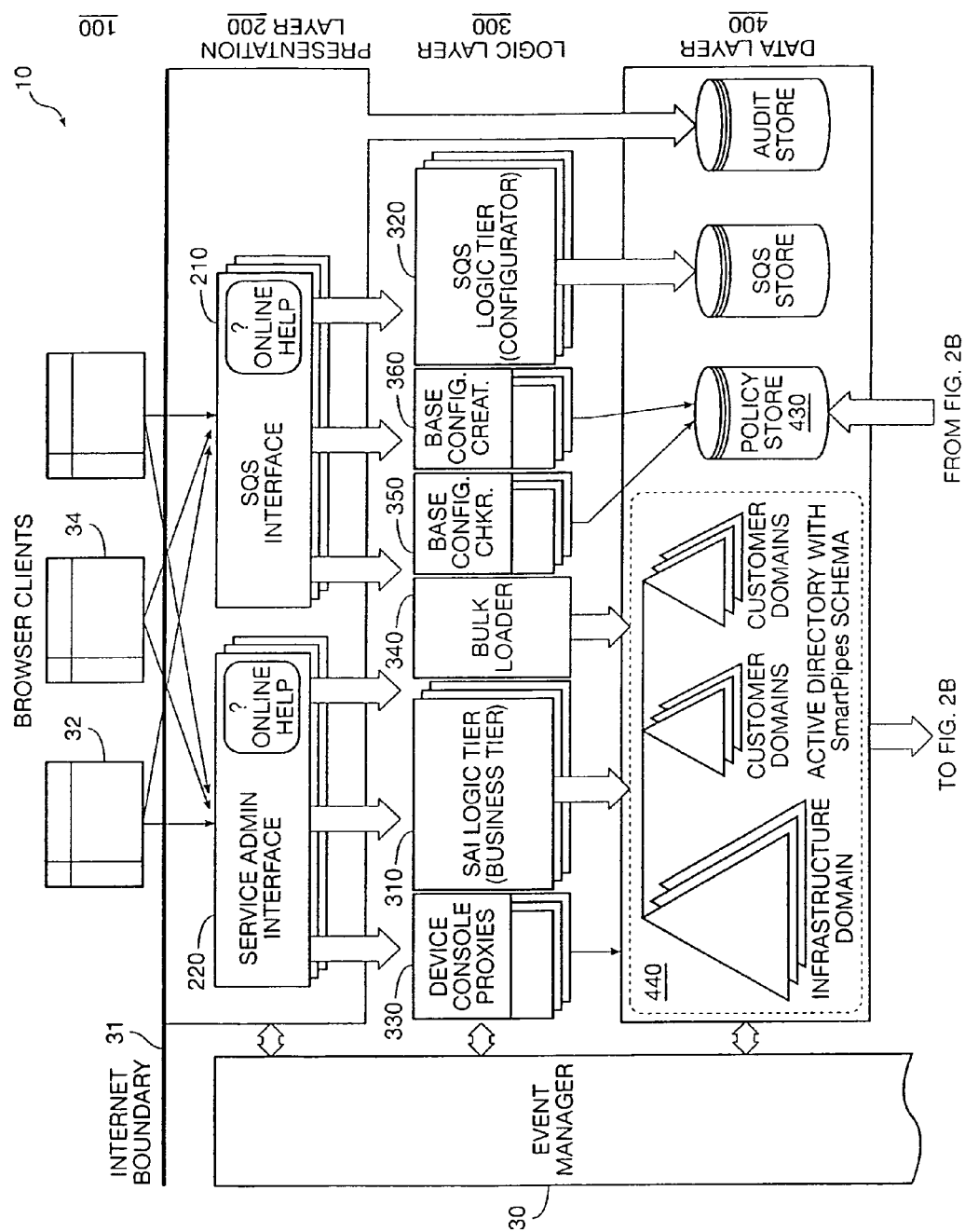
FIGS. 2A and 2B show various layers of the policy-based network management system of FIG. 1.
Figure 2B:
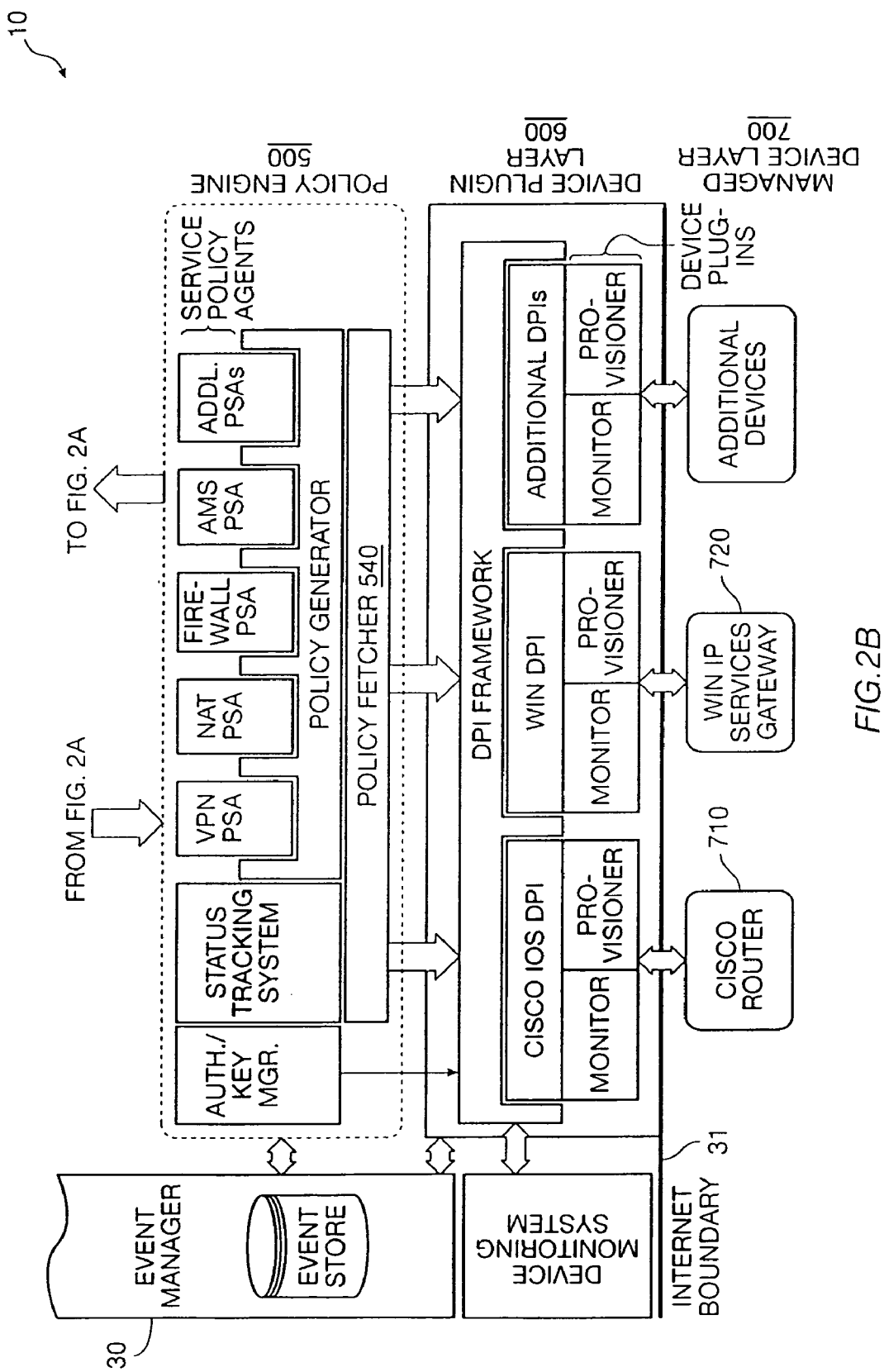

FIGS. 2A and 2B show simplified block diagrams of various layers of management system 10 of FIGS. 1A-1F, in accordance with one embodiment of the present invention. System 10 operates in accordance with a global policy service architecture and includes seven layers, namely, a client layer 100, a presentation layer 200, a logic layer 300, a data layer 400, a policy layer 500, a device plug-in layer 600 and a managed devices layer 700. System 10, also includes, among other modules, an event manager 30 and a device monitoring system 35. System 10 configures, monitors, and controls (i.e., manages) network devices, such as Cisco router 710 and Windows IP Services Gateway 720—in managed devices layer 700—via the internet 31.

System 10 provides a framework for describing internet protocol (IP) services by adopting network policies and managing the network devices (hereinbelow alternatively referred to as managed devices) in layer 700, in accordance with the adopted policies. System 10 is a data-center-based service architecture composed of an array of interacting software, network, and data store elements. System 10 is a dynamic, multi-layered, distributed architecture, and is secure and expandable.

To configure a network device and select and deploy network policies, a user first supplies information regarding his/her network devices (such as the devices' types, model numbers, IP addresses, base configuration data), as well other administrative information (e.g., a contact person at the user's company) to system 10 in one of the following two ways. The user may identify his/her network devices graphically and via an internet browser from various lists that system 10 displays to the user. System 10 collects the user data so identified and stores them in an XML file. Alternatively, the user may create an XML file containing such network identification data and transport that XML file directly to system 10 via the internet. It is understood that when a communication medium other than the internet is used, the user uses a GUI other than an internet browser and may use a file format other than the XML format. It is also understood that the user may create a file using a format other than the XML and which is directly viewable and transportable over the internet. The XML data identifying network devices—supplied by either of the above two methods—is subsequently converted to hierarchical data and written to an Active Directory™ 440.

Next, using a web browser, the user navigates through various policy lists—displayed to the user by system 10—from which lists the user selects and deploys network policies. The selected policy data are stored in Active Directory™ 440. Next, a policy engine in policy layer 500 retrieves policy data stored hierarchically in the Active Directory™ 440, knits different service-based policies together, converts the knitted policies from hierarchical to flat XML format, and thereafter stores the XML policy data which are service-based and device-neutral in policy store 430. Subsequently, an associated device plug-in residing in device plug-in layer 600 of system 10 receives the XML data—stored in the policy store—via the policy engine, translates the XML data to device-specific configuration data and, thereafter, transfers the device-specific configuration data to its associated network device thereby to configure the device and deploy the policies.

C. Client Layer

Client layer 100 forms the first layer of system 10. Communications between a client and system 10 are carried through a Secure Socket Layer (SSL) over Internet 30 and via client layer 100. In other words, client layer 100 is a graphical user interface through which users interact with system 10. Client layer 100 supports many of the popular internet browser platforms including, for example, Microsoft Explorer 32 and Netscape Navigator 34.

D. Presentation Layer

Presentation layer 200 forms the second layer of system 10 and includes interface modules that display to and accept from users context-sensitive World Wide Web (web) based pages containing hypertext, scripted Java, and runs Active Server Pages (ASP) web applications. Presentation layer 200 includes administrative interfaces which run on a distributed server farm that is expandable and dynamically load-balanced.

Presentation layer 200 includes, among other modules, a sales quoting system (SQS) interface module 210 running on a SQS server (not shown) and a service administration interface (SAI) module 220 running on a SAI server (not shown). All interface modules in presentation layer 200 are linked to an integrated online help module which provides context-sensitive web-based help.

D.1. Sales and Quoting System (SQS) Interface

SQS interface module 210 further includes a SQS customer interface module (not shown) and a SQS administrative interface module (not shown). SQS interface module 210 runs ASP web applications and includes an SQS database. SQS interface module 210 is coupled to SQS logic tier 320 of layer 300 via Selectica ACE Enterprise Server platform available from Selectia, Inc. located at 3 West Plumeria Drive, San Jose, Calif. 95134, as well as via Java servlets.

The SQS customer interface module provides a mechanism for customers to receive sales quotes and purchase network equipment and services. The SQS also enables a user to provide initial configuration information about his/her network devices and other information specific to the user's company. Such information include, for example, the network devices' types, manufacturers, model numbers, IP addresses, initial configuration data, as well as the name of a contact person at the user' company. The SQS customer interface enables a user to supply such information via two different methods.

In accordance with the first method, the client using a GUI identifies his/her network devices from various lists that the SQS customer interface module displays to the user. The displayed lists also include fields that enable the client to enter other required company-specific information (e.g., the name of a contact person at the client company). The data selected by the user are collected and stored in an XML file by the SQS customer interface.

In accordance with the second method, the client enters all such required data in an XML file and transports the file directly over the internet to the SQS interface module. Since an XML file may be created by one of many available commercial software tools and is directly transportable over the internet, the present invention overcomes many of the inefficiencies associated with other known LDAP-based systems—which require translation before transportation of a file over the internet. The XML file created by either of the above methods is transferred to a bulk loader, as described below.

The SQS customer interface module also enables a network device that has not been previously configured or initialized and thus is not yet connected to the internet, to be configured and thus be brought under the management system's control. When selected to configure a previously unconfigured device, the SQS customer interface module sends the initial configuration data to the base configuration creator, which carries out the configuration, as described below.

D.2. System Administration Interface (SAI)

SAI module 220 includes a policy administration interface module (not shown) and a device console interface module (not shown). The policy interface module allows users SAI module 220 manages client's corporate intranets and telecommuter networks. Via SAI module 220, system 10 clients create, edit, audit and deploy business-network policies, customize application descriptions, configure IP services and service points and manage their SAI accounts, thus eliminating the need for network management via IP addresses, ACLs, and other network implementation details.

Network policies administered by SAI 220 are carried out by service points. Service points may be configured to be broad-based, for example, to cover an entire LAN or a specific subnet. Alternatively, service points may be configured to be more narrowly based, for example, to represent a single application running on a single server. Furthermore, service points may be grouped into service groups for ease of administration. Via SAI 220, users may view the status of the adopted policies and audit actions performed by the managed devices.

D.2.1. Policy Navigation and Selection

SAI module 220 displays various lists of policies and their attributes to the users, from which lists the users select and deploy their desired network policies. FIGS. 3-11 show an exemplary process of policy creation and deployment using a two-paned window that is displayed to a user by SAI 220. Expandable tree-based views are displayed in the left pane by system 10 to enable the user to navigate and select such objects as network policies, service points and their corresponding services groups and security templates, and applications. When a folder is opened, the sign next to the folder changes from + to −.

Figure 3:
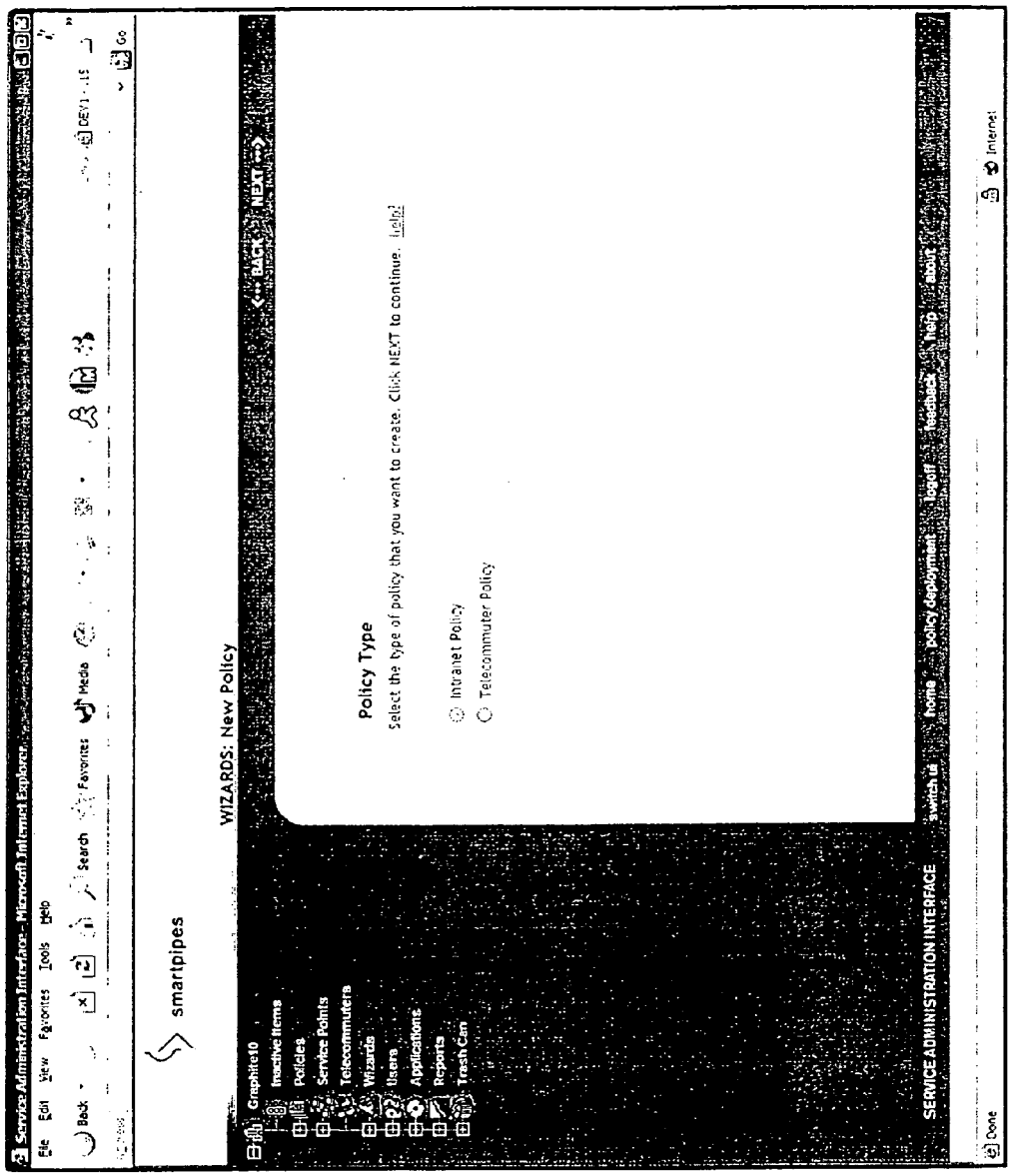
FIGS. 3-12 are screenshots of a user interface with a two-paned window with policies displayed in a tree structure, with the different figures showing different steps in the policy selection and navigation process.
Figure 4:
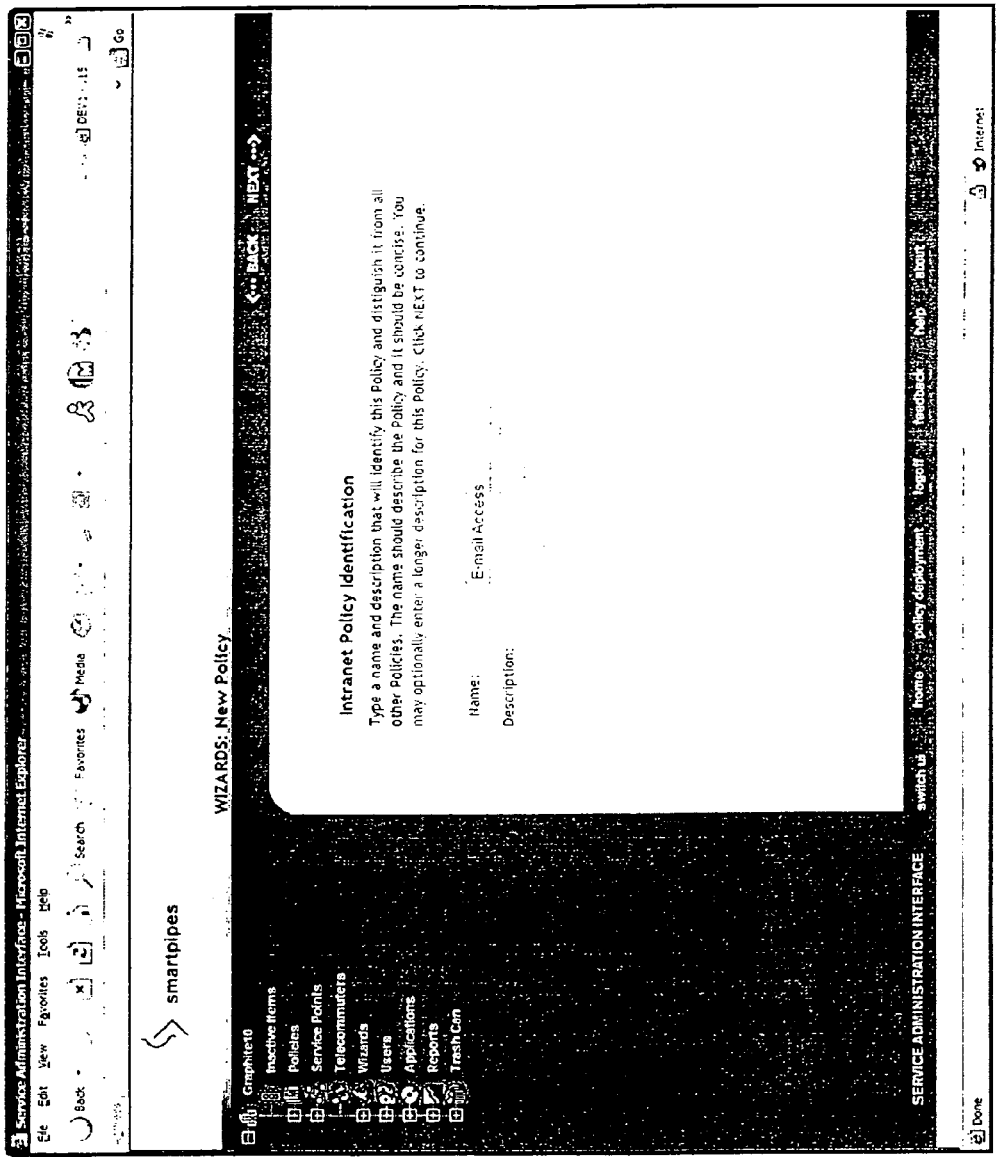

FIGS. 3-11 walk through an example for a new policy wizard. A similar interface is used for wizards for creating a service point, service group, security template, etc. FIG. 3 shows the home page of SAI 220 from where policy navigation begins. The home page displays two policy types, namely intranet and telecommuter policy types, that are available for selection on the right pane. A brief description of each available policy type is also provided on the right pane under the heading Policy Type. In the example shown in FIG. 3, the user selects the intranet policy type by clicking on the corresponding field. Thereafter, the user clicks on the NEXT button to proceed to the next stage.

Next, the user selects a name and a description to identify the selected intranet policy. In the example shown in FIG. 4, the user types "Email Access" as the name for the policy, and types a description for that policy. Thereafter, the user clicks on the NEXT button to proceed to the next stage.

Figure 5:
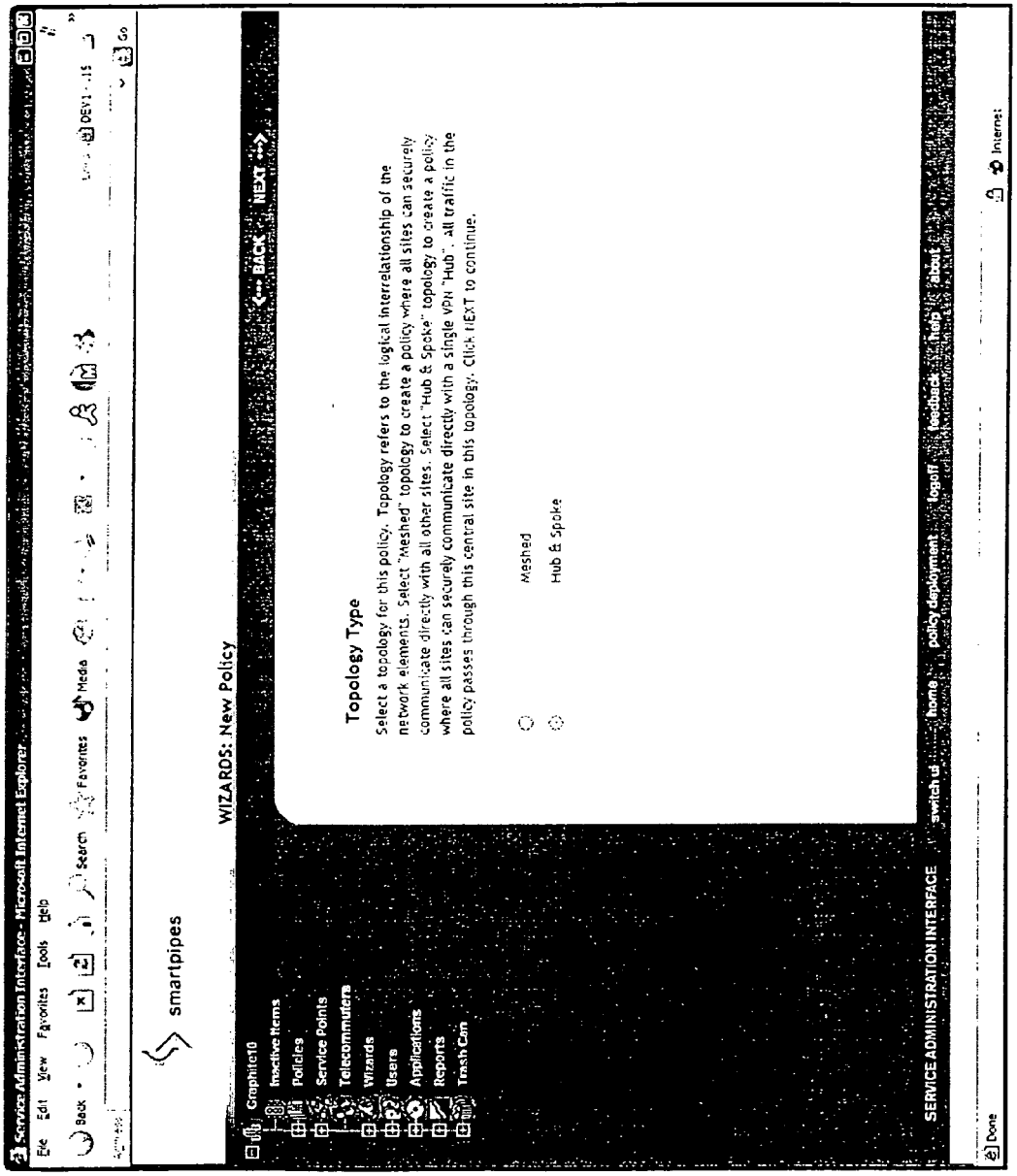

Next, the user selects a topology for the selected intranet policy. Two such topologies are shown in FIG. 5, namely a Meshed as well as a Hub & Spoke topology. In the example shown in FIG. 5, the user selects a Hub & Spoke topology. Thereafter, the user clicks on the NEXT button to proceed to the next stage.

Figure 6:
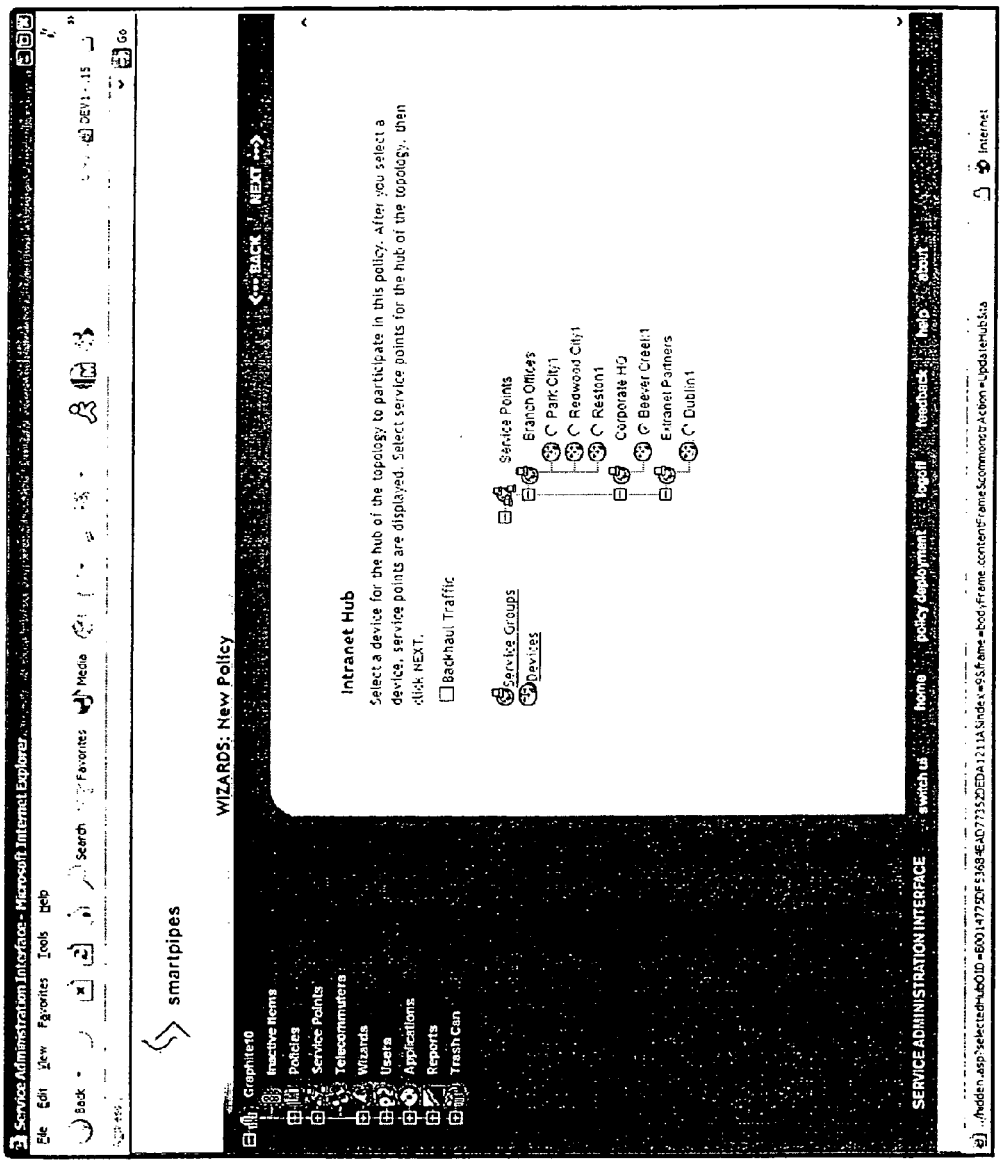
Figure 7:
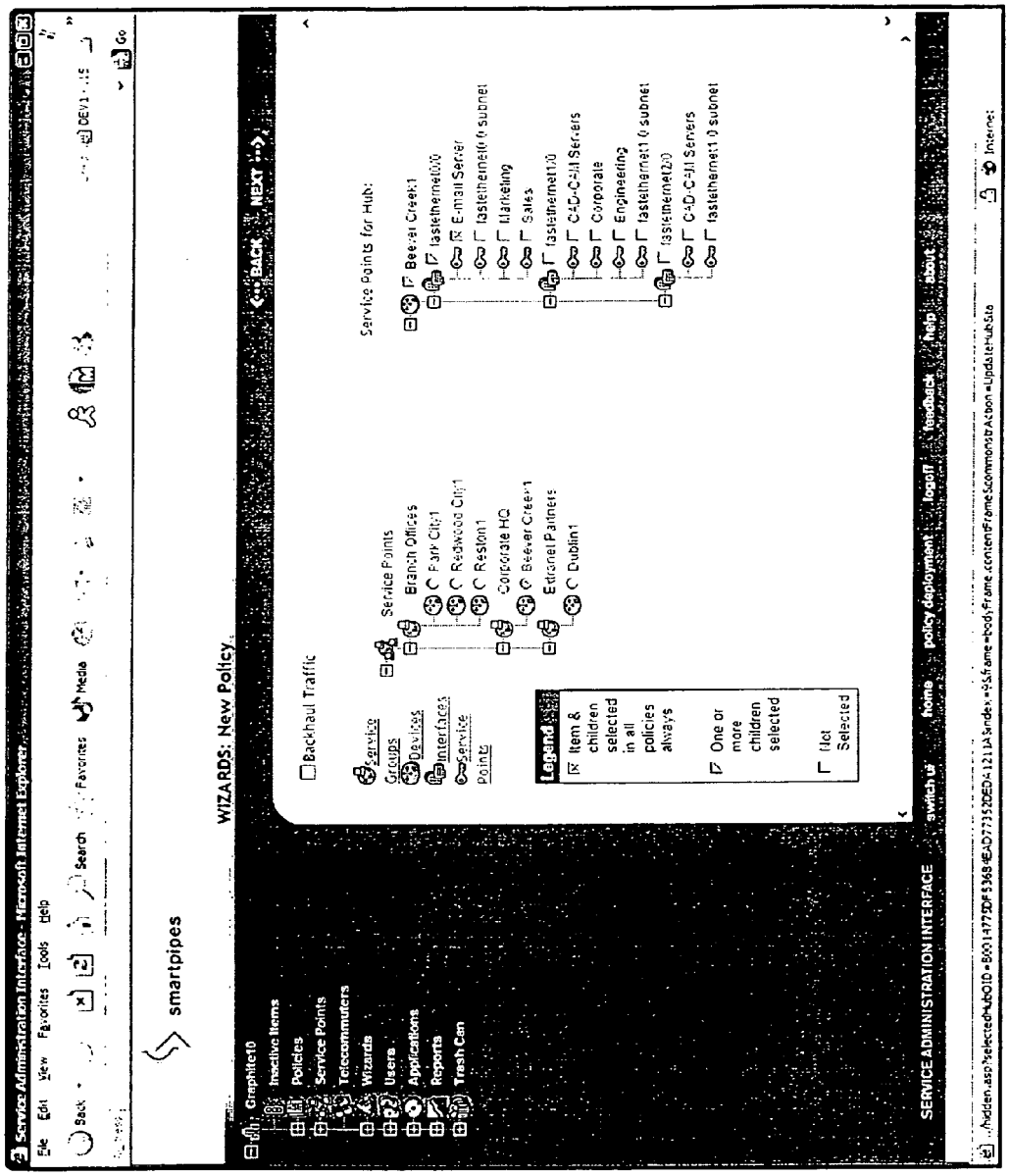

Next, as shown in FIGS. 6 and 7, the user selects an intranet hub from a device list which is displayed to the user (not shown) after the Devices field is clicked on. After the hub device is selected, service points for the hub are displayed. As seen in the Service Points tree of FIG. 6, Corporate HQ in Beaver Creek1 is selected as the service point. An expanded view of the selected service point Beaver Creek1 tree is displayed on the right pane. Service point Beaver Creek1 is shown as having three fastethernet sites for service, namely fastethernet0/0, fastethernet1/0 and fastethernet2/0. The user selects E-mail Server in fastethernet0/0 in Beaver Creek as a service point hub. Thereafter, the user clicks on the NEXT button to proceed to the next stage.

Next, the user selects the service points which are protected by the selected intranet policy. In the example shown in FIG. 8, devices Park City1 and Redwood City 1 associated with the service point Branch Offices are selected to support the service points for the policy. Thereafter, the user clicks on the NEXT button to proceed to the next stage.

Figure 8:
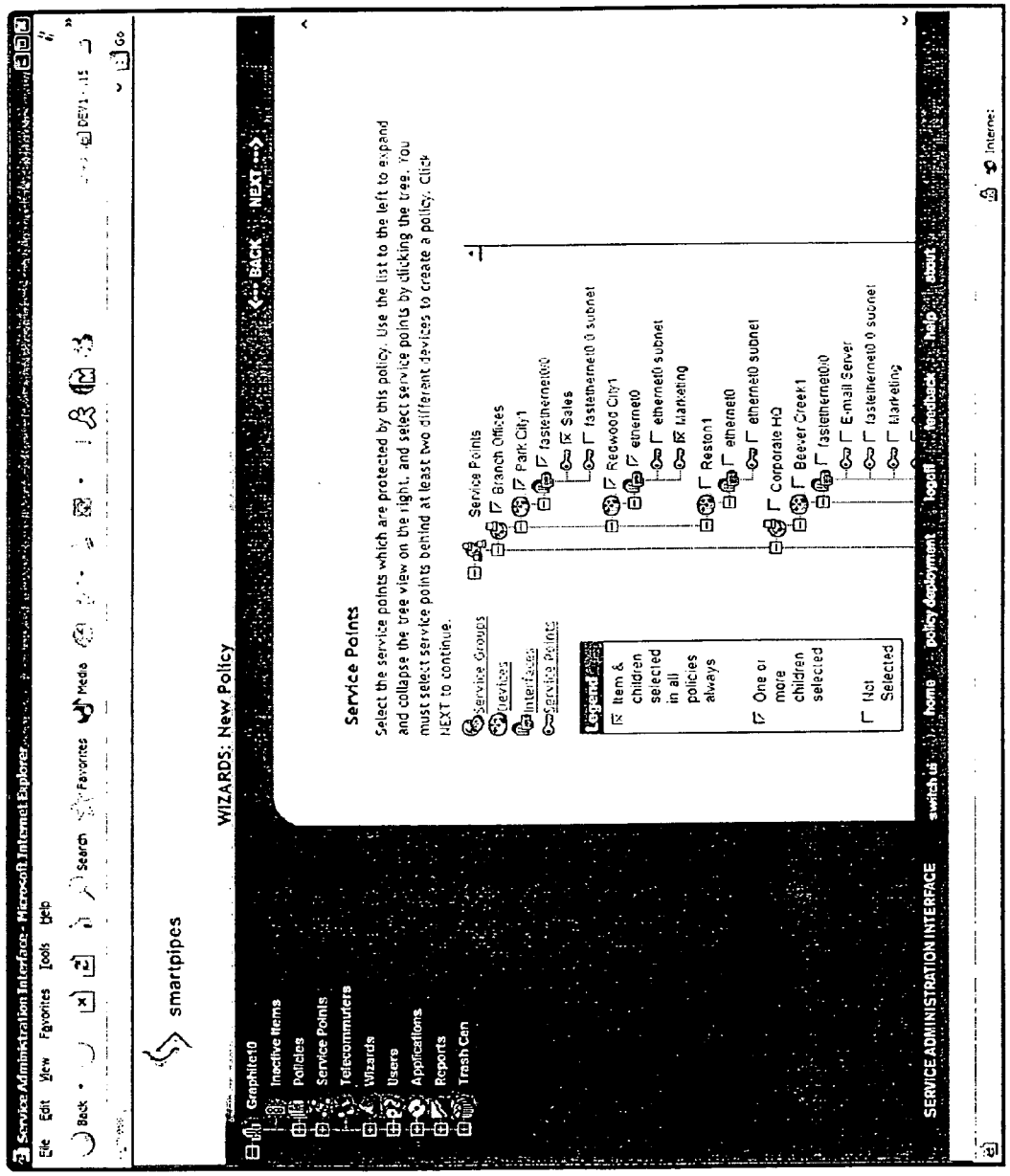
Figure 9:
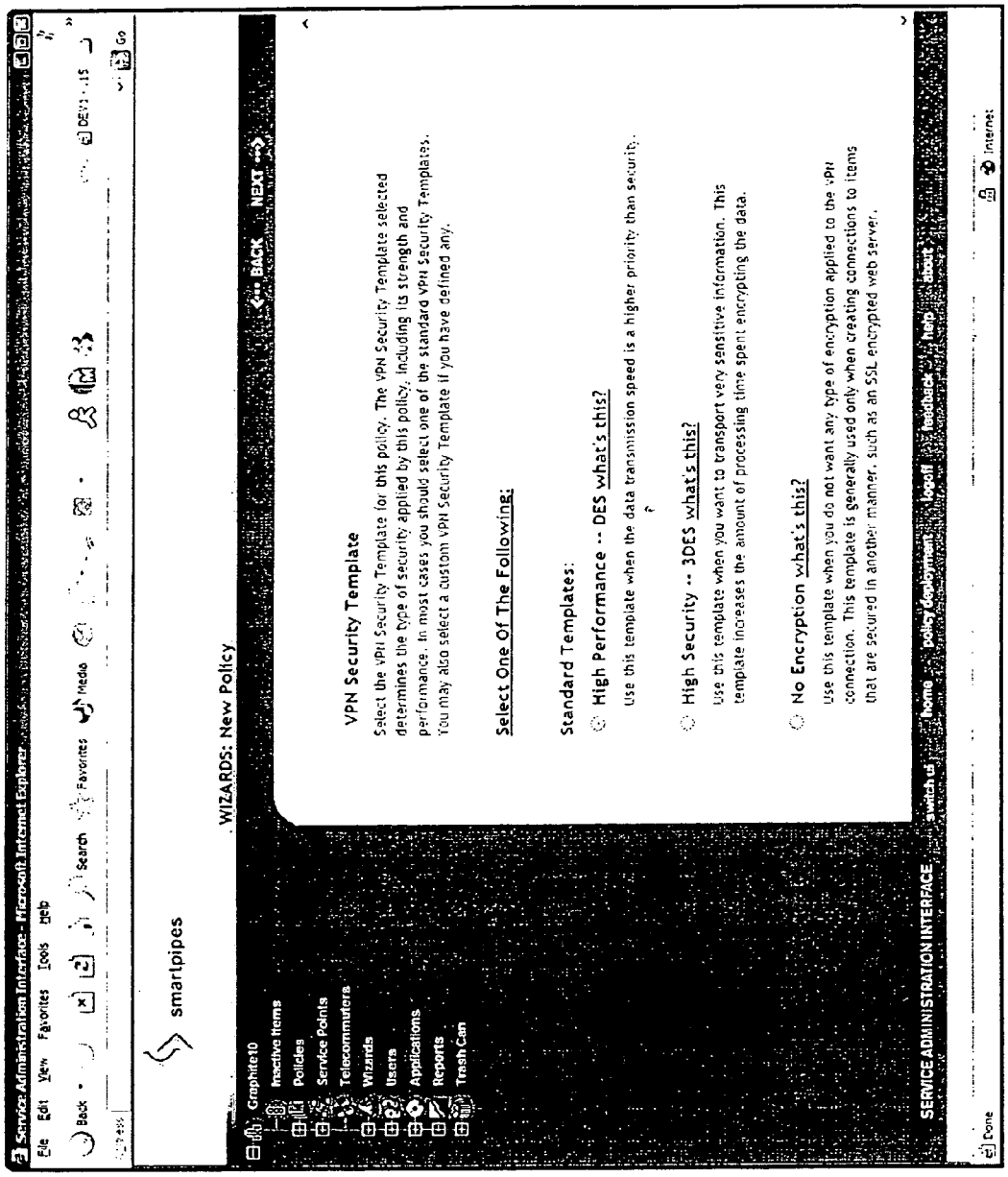

Next, as shown in FIG. 9, the user selects a VPN security template for the selected policy. Three such security templates, high performance, high security, and no encryption VPN security templates are shown in FIG. 8—with high performance VPN as the one selected by the user. Thereafter, the user clicks on the NEXT button to proceed to the next stage.

Figure 10:
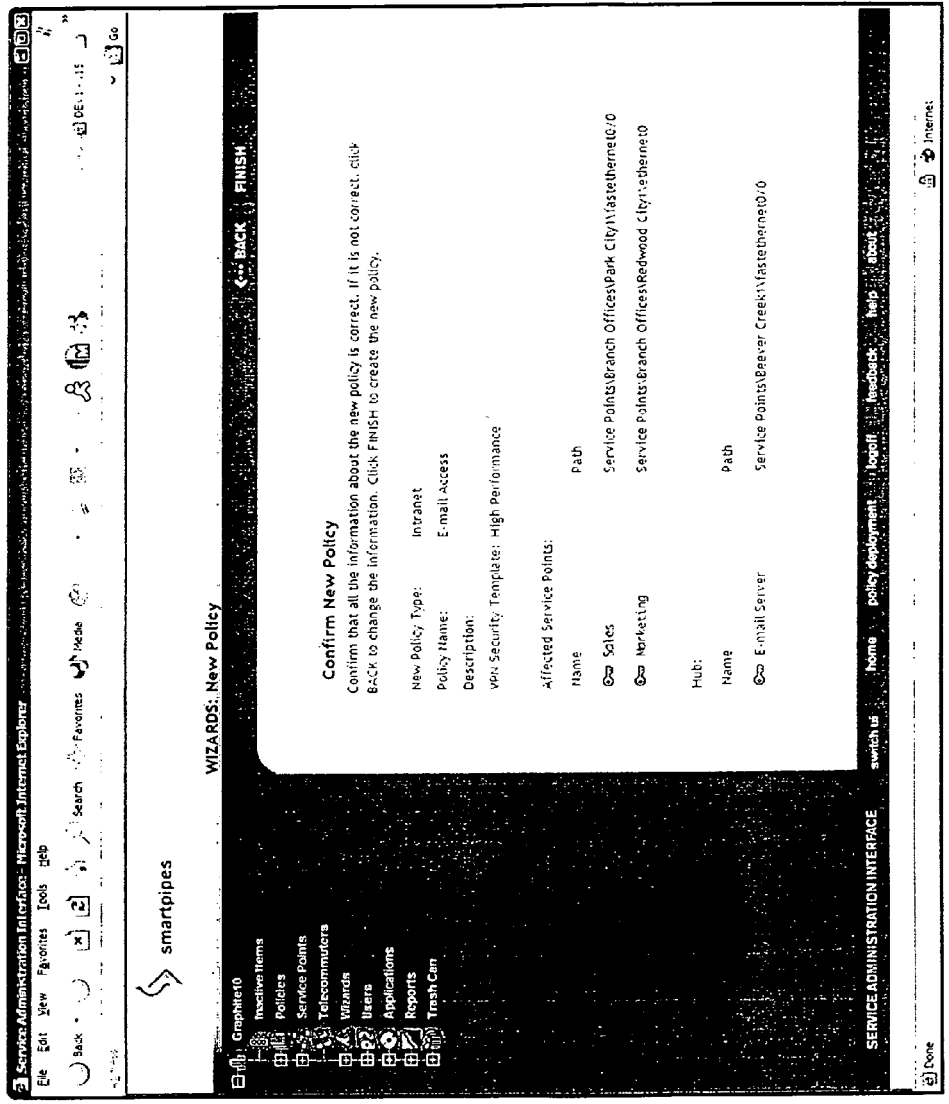

Next, as shown in FIG. 10, the selected policy data are displayed to the user for confirmation. If an error exists in the selected policy data, the user clicks on BACK key to reenter the data, otherwise, the user clicks on the FINISH key to create a new policy.

Figure 11:
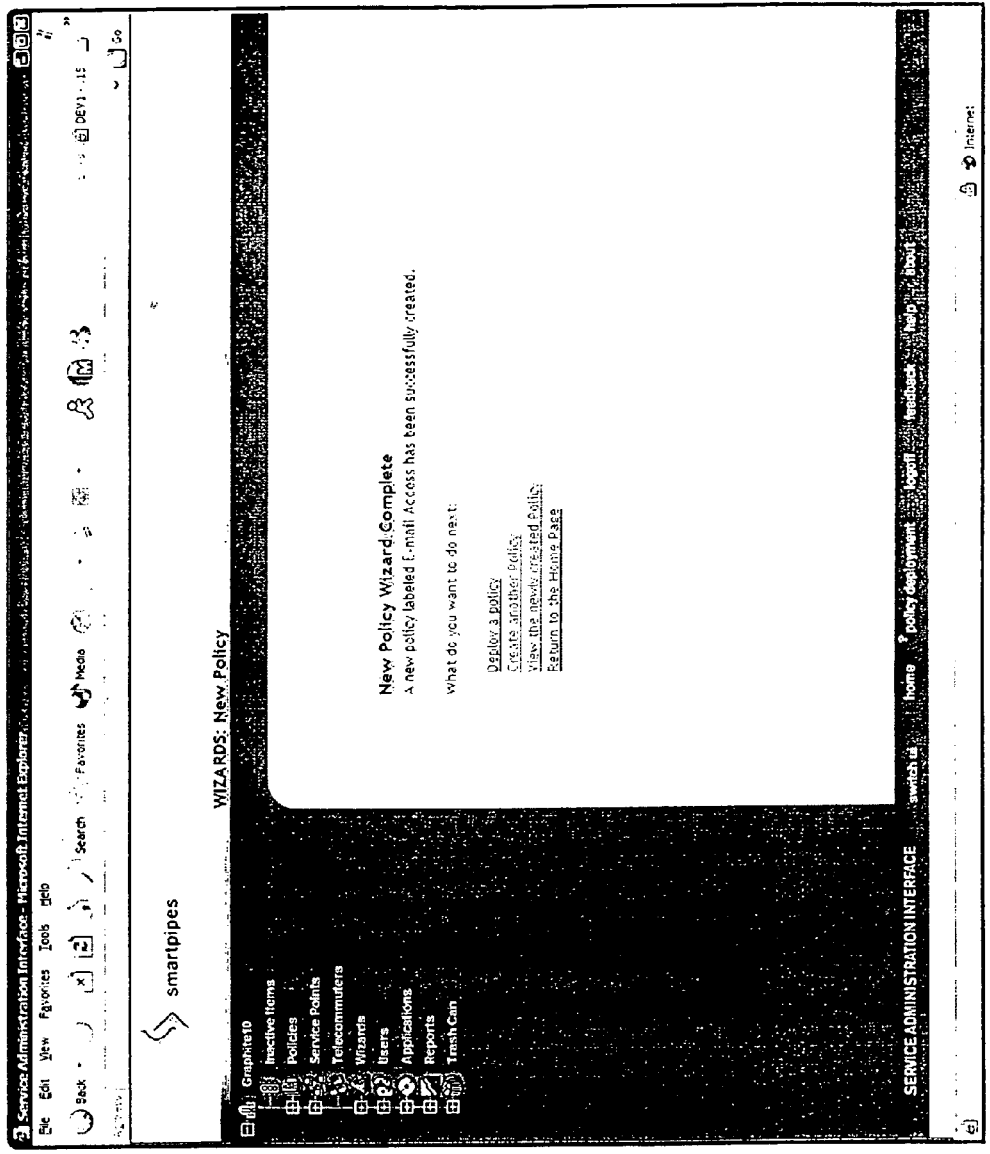

As shown in FIG. 10, by clicking on the FINISH key, the new policy is created. Thereafter, as shown in FIG. 11, the user may view the newly created policy, create another policy, deploy a previously created policy or return to the home page. The policies so created are subsequently stored in an XML file and passed on to SAI business logic tier 310, as described below.

Figure 12:
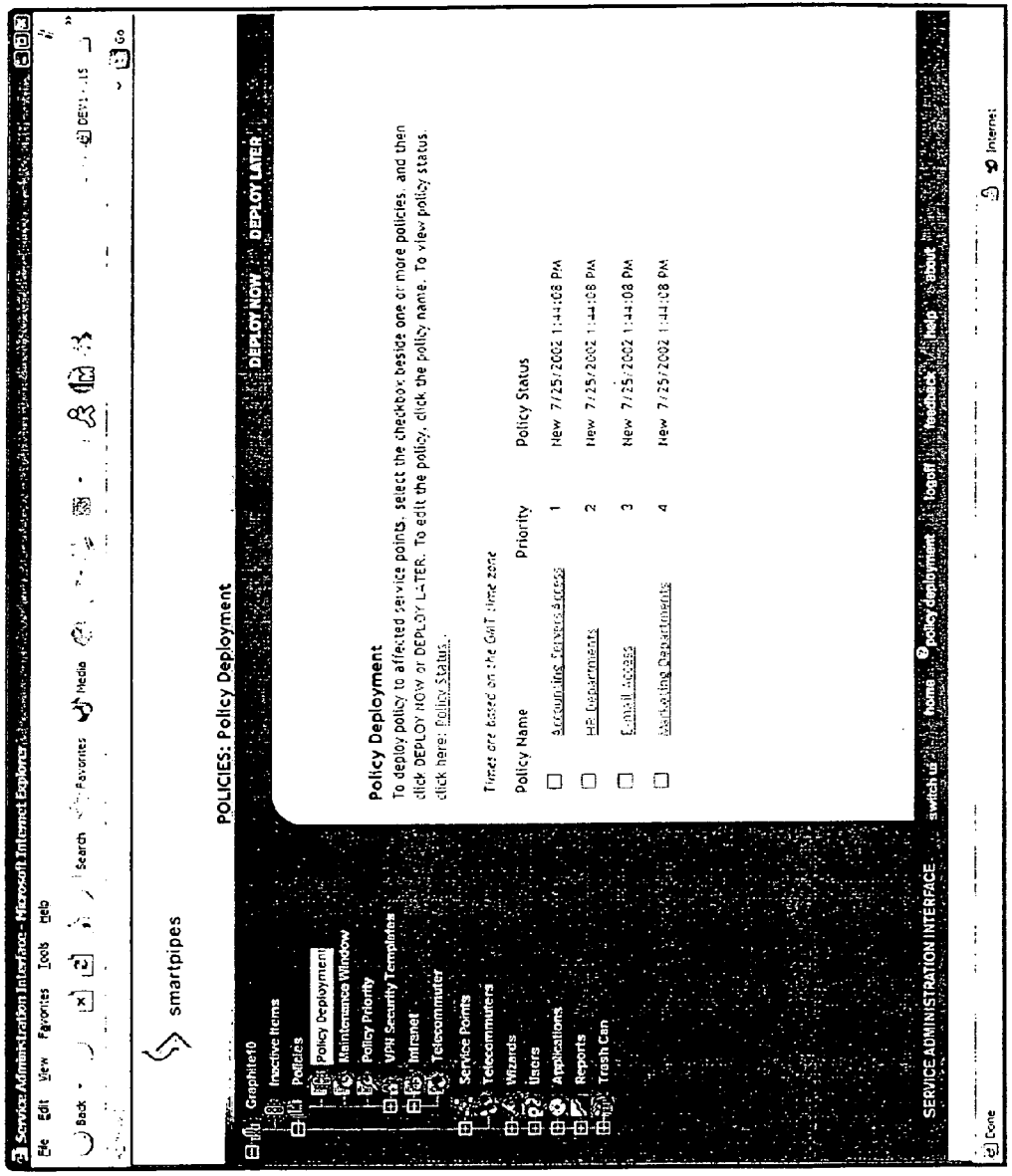

FIG. 12 illustrates a screen shot for policy deployment. This shows the tree structure on the left side pane. This is similar to the structure used for file folders in Windows, but is uniquely applied to network policies here.

D.3. Interactive Online Help

All user interfaces of SQS module 210 and SAI module 220 include integrated, interactive online help menu systems (not shown), which are web-based and context sensitive. System 10 users may navigate through the online help menu system by clicking on the folders in the help navigation tree. Buttons and other clickable items in the online help system menu are hot spots which, when clicked on, pop-up to display a description of the button's or the clicked item's function. The online help menu system also includes a searchable index which enables a user to enter a word or click on a selected subject to obtain help references associated with the entered word or selected subject. Further integrated into the online menu help system are drop-down menu for a number of the displayed and indexed selectable items.

E. Logic Layer

Logic layer 300 forms the third layer of system 10. Logic layer 300—via presentation layer 200—transforms and filters information entered into system 10 by a user and displays system 10's responses to the user. Logic layer 300 includes a number of business logic processes and mediates all communications and accesses between presentation layer 200 and data layer 400.

Device information is loaded into directory 440 using a bulk loader 340. A base configuration checker 350 ensures that the configuration information is valid, and a base configuration creator 360 creates bootstrap policy configurations to initially bring devices under active management. The base configuration checker and creator also validate and created configurations after a device is under active management.

E.1. Bulk Loader

Figure 13:
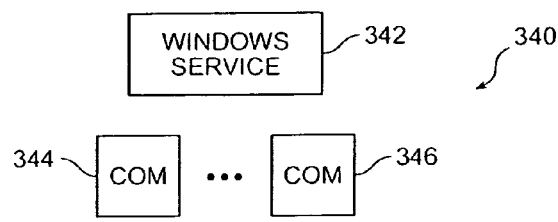
FIG. 13 is a block diagram of a bulk loader according to an embodiment of the invention.

Bulk loader 340 receives from the SQS interface module 210 the XML file(s) containing data about the user's network devices and the user's company, as described above. A user could provide all the configuration data for all the use's devices in one flat XML file. The bulk loader would then put it into a hierarchical format in directory 440. The bulk loader includes a Windows Service 342, as shown in FIG. 13, and one or more COM components 344, 346. Service 342 maintains a thread pool and all SCM-related activities related to that thread pool (start, stop, pause, etc.) It recognizes a new file being uploaded, and initiates a thread to handle the file. Each thread maintains the appropriate directory location for the input file passed to directory 440, and invokes the correct COM component to process the XML data within the input file Each component implements the IADObject XMLLoader interface and is a stand-alone COM component (DLL server). Each is responsible for handling one or more modifications (insert, update, delete, move, disable, etc.) to the object type it supports. Each supports asynchronous method calls to the methods it supports. Several of the listed components also make use of a business rule component that implements a IADBusinessRuleHandler interface. The components include:

(1) A component for billing definitions.
(2) A component for subscribed services.
(3) A component for contacts for both customer profiles and companies.
(4) A component for customer profiles that includes the billing component, the subscribed services component and the contacts component.
(5) A component for user objects, including administrators.

(6) A component for devices (such as Cisco routers and Win2K edge devices). This component will be responsible for the entire device tree of objects including the interface, application server group, IP list and port list.

(7) A component for company organizational Units (OUs) that includes the user component and the device component (which includes the interface and application server group components that it encompasses).

E.2. Base Configuration Creator

Base configuration creator 360 creates an initial bootstrap policy configuration that will allow a device to be successfully brought under secure active management by the system. It is used to configure a network device either when a network device has not been previously configured, or when a network device has previously been configured but the user desires to change the configuration data of the device in a manner that is not supported by system 10, as described below. Together with the base configuration checker, described below, they allow a customer to manipulate a device configuration without making a change to policy. The configuration is then automatically checked to insure it conforms to the policies.

A new network device that has not been previously configured cannot be connected to the internet and be brought under system 10's management. Accordingly, to configure and thus manage such new network devices, system 10 via the SQS Interface 210—which has knowledge of such devices, as described above—sends an initial bootstrap configuration data in the XML format to base configuration creator 360, which receives the XML file containing the configuration information, and, thereafter, stores the XML file in policy store 430 for later retrieval by policy layer 500.

There may be occasions when a user seeks to change the configuration of a managed device in a way that does not conform to system 10's supported policies—without changing the existing deployed policies. For example, system 10 may not support policies related to Novel ipx protocols, yet system 10 enables a user to configure a network device in accordance with this protocol without changing any of the existing deployed policies. To accommodate such configuration data without changing the existing policies, the user first enters the configuration data via the SAI 220 interface. Next, the SAI interface 220 creates an XML file containing the configuration data and subsequently transfers the XML file to base configuration creator 360. Thereafter, base configuration creator 360 transfers the XML file containing the configuration information to policy store 430 for later retrieval by policy layer 500.

The Configuration Creator is a ATL COM DLL, it uses COM's free threaded object model which allows the Creator object to be used by multiple threads within a single process. The Creator handles the synchronization problems by using a locking mechanism to ensure thread-safe.

Figure 14:
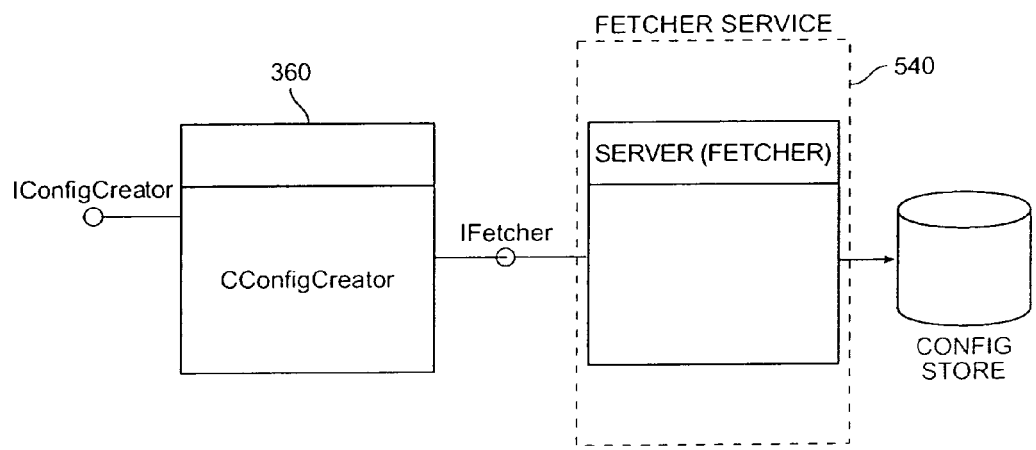
FIG. 14 is a block diagram illustrating the connections to a configuration creator according to an embodiment of the invention.

FIG. 14 is a block diagram showing the Configuration Creator. The Creator 360 is a COM Client of an IFetcher interface which instantiated by the Policy Fetcher Service 540 (see FIG. 2B). As a COM Client, the Creator will request the Base Configuration and/or the Policy of a device by providing the Device ID, Policy ID and the Version Number (if known). The Policy in XML format is returned by the IFetcher. The base configuration will be in the form of CLI, if the device is a Cisco Router, or else it will be in the form of XML. If the device type is a Cisco Router, the Creator will validate the XML message of the Policy and convert the message into CLI format by use of XMLCLI DLL. The message will then append to the Base Configuration (which is also a CLI) and store the message into an IStream Interface, then returns it to the client. If the device type is Windows, both the Base Configuration and the Policy returns by the IFetcher will be in the XML format. The Creator will then put both messages together into a IStream interface and return to the client. No conversion is being done.

E.3. Base Configuration Checker

System 10 also includes a base configuration checker module 350 that validates the base configuration data for each managed device to ensure that such data are, for example, syntactically correct and do not violate the deployed policies.

Base configuration checker 350 has knowledge of the allowed configuration data for each type of managed device. Accordingly, upon receipt of configuration data, from either the SQS interface module 210 or the SAI 220, base configuration checker 350 strips out invalid commands (i.e., password commands) checks the commands and data for grammatical and syntactical correctness as well as for conformity with allowed configuration states of each managed device and thereafter either rectifies any violations that it detects or reports the violation(s) to the user.

For example, assume that a user during the initial configuration of a Cisco router, among other commands, specifies a password for future access to the router, an action that violates system 10's inherent and enforced management policies. Assume further that the user-supplied configuration data are not in not in conformity with known configurations for the Cisco router, or are otherwise grammatically or syntactically incorrect. Base configuration checker 350 automatically removes the password-related commands, detects other nonconformity or disallowed violations, and thereafter, depending on the violation type, either reports the violation to the user asking for corrective action or corrects the violation.

Figure 15:
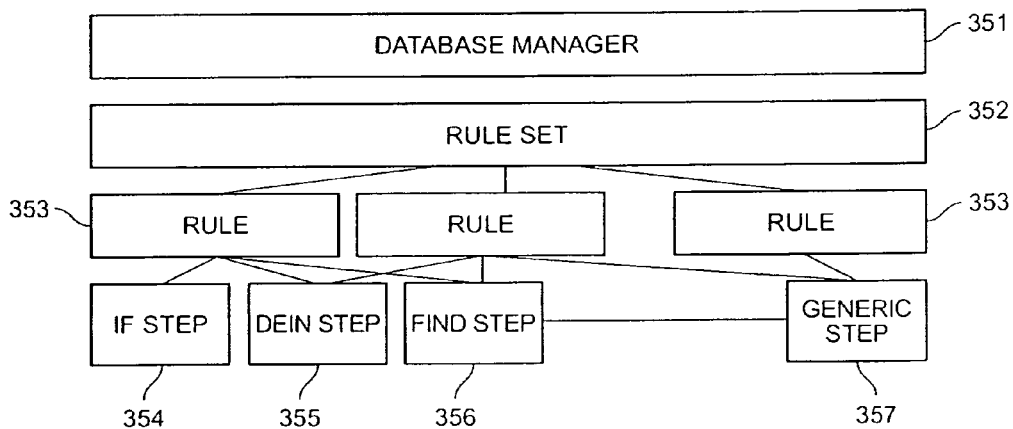
FIG. 15 is a block diagram of a base configuration checker according to an embodiment of the invention.

FIG. 15 is a high level architectural overview diagram of base configuration Checker 350. The Configuration Checker is composed of 4 basic components that are implemented as C++ class Objects. The components are Database Manager Object 351, RuleSet Object 352, Rule Objects 353 and Step Objects 354, 355, 356 and 357.

Figure 16:
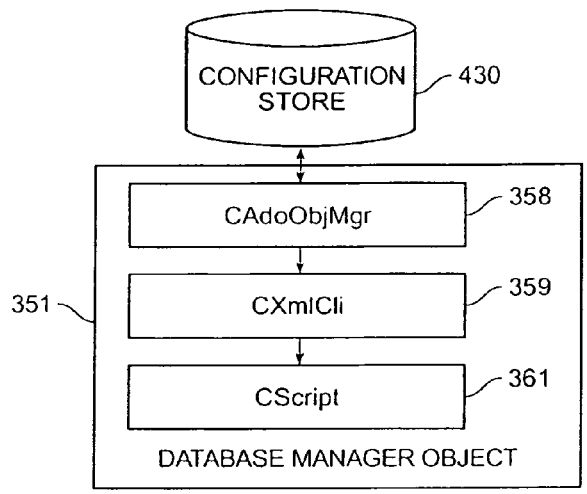
FIG. 16 is a block diagram of the database manager object of FIG. 15.

Database Manager Object. Referring to FIG. 16, the Database Manager Object 351 shown in more detail. Database Manager Object 351 interfaces with the Configuration Store (Policy Store 430) by use of a CAdoObjMgr object 358. It establishes a connection to the Configuration Store using ODBC and retrieves the System Base Configuration and the policy of a specific device. If the configuration of the device is a Cisco router, an XML format of the system Policy will be retrieved from the Configuration Store, and will be converted into text format by using CXmlCli Object 359. The system base configuration will be in the CLI format so no conversion will need to be done. The configuration will be stored in the CScript object 361 and pass it to the RuleSet object.

The Database Manager Object gets the DSN name from a registry. The connection string will not hard-code the login name, the password and the hostname of the Configuration Store. This information will be set in the DSN.

Rule Set Object. The RuleSet object reads that file and instantiates different Rule objects based upon the type of steps defined in the file. Rule Objects will be put into a STL Map and managed by the RuleSet Object. The Name of the Rule will be the key of the Map Object. If the Rule Object returns an error during execution, this error will be logged to the Application Event Reporting System and returned error information to the IConfigurationChecker by use of IsupportErrInfo Interface.

Customers may modify the Rules due to the change of requirement.

Rule Object. The Rule object manages and maintains a collection of Step Objects. The RuleSet object instantiates the Rule object and passes a CScript Object that contains the steps (note: they are the steps defined in the Text file, not the step objects). The Rule Object iterates the lines in the Script Object and creates Step Objects. Those Step objects will be stored in STL Vector. The Rule object controls the flow of the steps during execution. Each Step, when executing, will return an integer value to indicate the next step number. The Rule Object, based on the next step number returned by the current Step Object, jumps to next step and so on. If the Step Object returns EXIT_STEP, the execution is finished.

The Rule object provides resources to the Step Object. The resources, such as CScript object of the new base configuration and the CScript object of the system configuration, will be available for the Steps to look for information. A Step object is not allowed to access directly to those resources; instead, the Rule object provides a set of APIs for the Step objects to the information they need.

Step Object. A Rule may compose of one or more steps. The format of the step must be:

Step #: StepName goto nextTrueStep else go to next FalseStep

An example of a step:

3: if (command=interface) goto 6 else goto 10

Rule object gets the command of the line using CSmartRuleLine and creates a Step object. In this case, an IF Step is created. The condition (if any) is passed in to the Step ("command=interface" in this case). When the Step object is being executed, it may need resources from the Rule object in order to complete the execution. In this case, the Step object asks the Rule object to get the name of the command of the line, and see if the name is "interface". If it is true, step #6 will be returned, or else, step #10 will be returned.

E.4. SAI Business Logic Tier

Following the transfer of the XML file by bulk loader 340 to directory 440 for storage, SAI 220 transfers the file containing the policies selected by the user, as described above, to the business logic tier module 310, which subsequently converts the format of the policy data in this file, from flat to hierarchical and, thereafter, stores the hierarchical policy data in directory 440.

SAI business logic tier module 310, which is based on Microsoft Windows distributed internet architecture (DNA), manages all communications between client layer 100 and data layer 400 SAI and decouples applications running on client layer 100 from business logic processes via a group of C++ objects that is a part of a Component Object Model (COM) Dynamic Link Library. The decoupling enables system 10 to enhance or otherwise modify the functions performed by logic layer 300 without affecting client layer 100 applications.

SAI business logic tier module 310 has a logic core module based on COM+ and generates and assigns a different 16-bit mini global unique identifiers (mini-GUID) to each identifiable network entity (e.g., network interface card).

Each 16-bit mini-GUID is automatically generated, globally unique and operates within the directory system of directory 440 of layer 400. Because the min-GUIDs are only 16-bits wide, they are processed faster thus giving rise to an improved network performance. The 16-bit mini-GUIDs ensure uniqueness for all identifiable network entities within the universe formed by the system 10 managed networks, i.e., system 10 clients whose networks are managed by system 10. The mini-GUIDs remain unchanged throughout the life of each network entity.

The performance improvement as a result of using 16-bit mini-GUIDs is achieved by reducing the number of compare and filter operations that SAI business logic tier module 310 performs in order to mediate all accesses between client layer 100 and directory 440 in data layer 400.

E.5. Device Console Proxy

Device console proxy module 330 enables a system 10 user having security privileges, to directly access a managed device in layer 700 via a telnet style interface. Device console proxy module 330 supports both synchronous and asynchronous as well as both in-band (i.e., through a monitoring tunnel) or out-of-band (i.e., through a modem) methods of access to the managed devices. Device console proxy module 330 is extensible to support any type of managed device.

Device console proxy module 330 includes a GUI for transmitting signals to a managed device, however, responses from the managed device under the device console's control are text-based. The degree of control over a managed device via the device console proxy module 330 is determined by the extent of the security privileges granted to a user of system 10, which may vary at the client's request.

Device console proxy module 330 enables users to gain direct access to a managed device without disrupting the network management. All required passwords and encryption keys for accessing and controlling the devices in layer 700 are initially transferred to system 10 by clients owning the devices. Thereafter, for security purposes, through a sequence of randomization the passwords and encryption keys are altered and maintained by system 10. Consequently, with the exception of system 10, no other user or device owner has knowledge of the passwords and encryption keys—that are generated by system 10 and are required to gain access to a managed device.

Device console proxy module 330 creates a secure bypass tunnel to a managed device without disrupting the management of the remaining managed devices. The secure bypass tunnel to a managed device dispenses with the need for an authorization password/encryption key and thus facilitate access to a managed device to, for example, interactively trouble shoot in case a problem arises. To dynamically activate the device console proxy module 330, a device console interface in SAI layer 220 is launched in response to related commands issued by a user into his/her internet web browser in layer 100. The issued commands pass through the secure tunnel and are subsequently executed by the device. The responses from the device pass through the secure tunnel and thereafter are displayed on the user's web browser. When access to the device is no longer desired, the user enters a series of related commands on his/her web browser which causes the console window to close, thereafter, the tunnel is removed and the device returns under the management of system 10 dynamically.

Consequently, both the launch and closure of the device console proxy module 330 are dynamic operations. The criteria for identifying individuals with authorization to access the managed devices via device console proxy module 330 is part of the network policy management and is stored in directory 440 of system 10.

Figure 17:
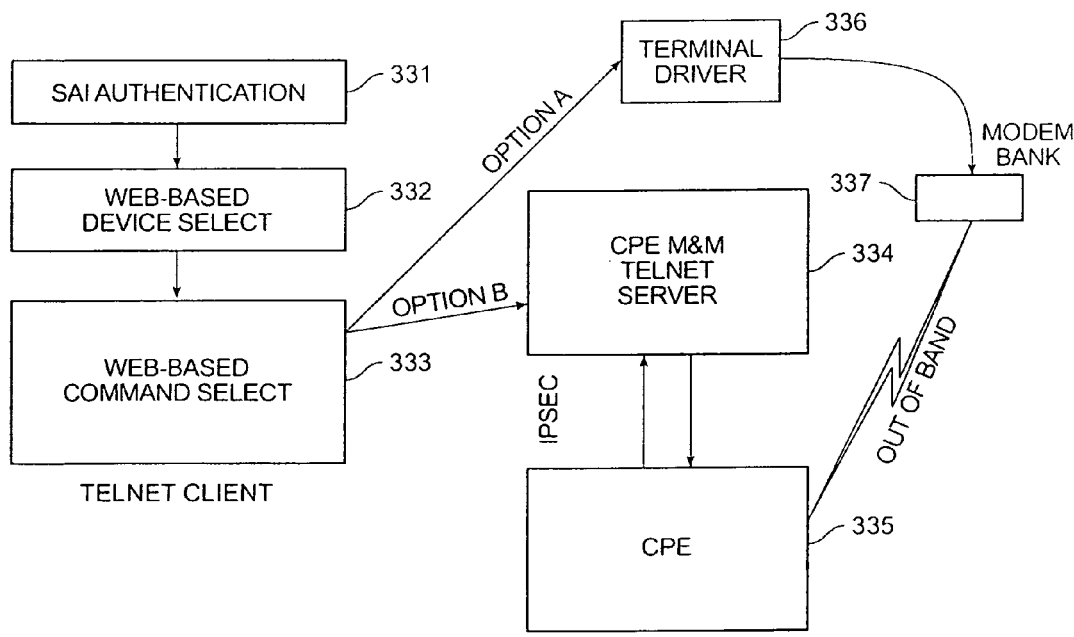
FIG. 17 is a block diagram of a device console proxy according to an embodiment of the invention.

FIG. 17 is a high level diagram of the operation of the device console proxy. A user is authenticated in SAI 331. A web-based device select 332 allows the user to select from a list of valid devices. A web-based command select 333 allows a user to select a command, which is then issued and sent to the device through options A or B. Option A uses a terminal server 336 and modem bank 337, while option B uses CPE M&M Telnet Server 334 and CPE 335 and modem bank 337. The valid command set for a particular user is determined from a set of rules that are read in by a tool at the time of authentication. Option A allows access to a device when the option B interfaces are inaccessible.

E.6: SQS Logic Tier

SQS logic tier module 320 is known in the prior art and is based on the Selectica ACE Enterprise Server platform available from Selectia, Inc. located at 3 West Plumeria Drive, San Jose, Calif. 95134. SQS business logic tier module 320 is a rule-based product configuration engine.

The specific embodiments of the present invention described above are illustrative and not limitative and various modifications, alterations, alternative constructions, and equivalents thereof are also encompassed within the scope of the invention. Additions, subtractions, deletions, and other modifications and changes to the present invention may be made thereto without departing from the scope of the present invention as is set forth in the appended claims.

What is claimed is:

1. A method of selecting and deploying network policies for a plurality of customer network devices under control of a policy-based network management system over a connecting network, the method comprising:

receiving a file that identifies the plurality of customer network devices in a format that is directly viewable on a user GUI and is directly transportable over the connecting network;

converting the file into hierarchical data;

writing the hierarchical data to an Active Directory; and storing a user selection of network policies for the plurality of customer network devices in the Active Directory.

2. The method of claim 1 wherein said connecting network is the Internet.

3. The method of claim 1 wherein said user GUI is an Internet browser.

4. The method of claim 1 wherein said file format is XML.

5. The method of claim 1 wherein the file identifies each one of the plurality of network customer devices by a device type, an IP address and a base configuration.

6. The method of claim 1 further comprising:

retrieving data from the Active Directory and processing the data to provide service-based, device-neutral policy data; and storing the service-based, device-neutral policy data in a policy store.

7. The method of claim 6 further comprising using a device plug-in to translate the service-based, device neutral policy data stored in the policy store into a device-specific configuration for one of the customer network devices.

8. The method of claim 7 further comprising transferring the device-specific configuration to the one of the customer network devices.

* * * * *